(12) United States Patent
Smith et al.

(10) Patent No.: US 9,569,340 B2
(45) Date of Patent: *Feb. 14, 2017

(54) GENERATING PRODUCTION SERVER LOAD ACTIVITY FOR A TEST SERVER

(71) Applicant: INTERNATIONAL BUSINESS MACHINES CORPORATION, Armonk, NY (US)

(72) Inventors: Richard J. Smith, Round Rock, TX (US); Gary D. Williams, Driftwood, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/802,188

(22) Filed: Jul. 17, 2015

(65) Prior Publication Data

US 2015/0326465 A1 Nov. 12, 2015

Related U.S. Application Data

(63) Continuation of application No. 13/447,925, filed on Apr. 16, 2012, now Pat. No. 9,106,451, which is a
(Continued)

(51) Int. Cl.
G06F 15/16 (2006.01)
G06F 11/36 (2006.01)
(Continued)

(52) U.S. Cl.
CPC ....... *G06F 11/3664* (2013.01); *G06F 11/3688* (2013.01); *H04L 12/6418* (2013.01);
(Continued)

(58) Field of Classification Search
CPC .............. G06F 11/3688; H04L 12/6418; H04L 41/0681; H04L 43/08; H04L 43/0876; H04L 43/12
(Continued)

(56) References Cited

U.S. PATENT DOCUMENTS 6,178,441 B1 1/2001 Elnozahy
6,574,617 B1 6/2003 Immerman et al.
(Continued)

FOREIGN PATENT DOCUMENTS

CN 1549978 A 11/2004
CN 1784662 A1 6/2006
(Continued)

OTHER PUBLICATIONS

WIPO Appln. No. PCT/IB2012/056080, International Search Report and Written Opinion, Mar. 7, 2013, 8 pg.
(Continued)

*Primary Examiner* — Hitesh Patel
(74) *Attorney, Agent, or Firm* — Cuenot, Forsythe & Kim, LLC (57) ABSTRACT

A method of replicating on a test server a production load of a production server. The method can include creating the production load on the production server by processing client requests received from clients. The method further can include, while the client requests are processed, via a processor, in real time, replicating the production load to generate a replicated production load that represents the client requests and defines state information representing unique states formed between the production server and the respective clients. The method also can include, in real time, communicating the replicated production load in order to replicate the production load on the test server.

13 Claims, 5 Drawing Sheets

Related U.S. Application Data continuation of application No. 13/297,314, filed on Nov. 16, 2011, now Pat. No. 9,148,304.

(51) Int. Cl.
| | |
|---|---|
| *H04L 12/26* | (2006.01) |
| *H04L 29/08* | (2006.01) |
| *H04L 29/06* | (2006.01) |
| *H04L 12/64* | (2006.01) |

(52) U.S. Cl.
CPC .............. *H04L 43/50* (2013.01); *H04L 67/10* (2013.01); *H04L 67/1095* (2013.01); *H04L 67/42* (2013.01)

(58) Field of Classification Search
USPC ......................................... 709/203, 224–227
See application file for complete search history.

(56) References Cited

U.S. PATENT DOCUMENTS

| | | | |
|---|---|---|---|
| 6,760,745 | B1 | 7/2004 | Tan et al. |
| 6,789,203 | B1 | 9/2004 | Belissent |
| 6,981,180 | B1 | 12/2005 | Bailey et al. |
| 7,984,015 | B2 | 7/2011 | Dias |
| 8,429,736 | B2 | 4/2013 | Green et al. |
| 9,106,451 | B2 | 8/2015 | Smith et al. |
| 9,148,304 | B2 | 9/2015 | Smith et al. |
| 2005/0080855 | A1 | 4/2005 | Murray |
| 2006/0288256 | A1 | 12/2006 | Mathew et al. |
| 2006/0291473 | A1 | 12/2006 | Chase et al. |
| 2007/0067104 | A1 | 3/2007 | Mays |
| 2007/0083602 | A1 | 4/2007 | Heggenhougen et al. |
| 2007/0112785 | A1* | 5/2007 | Murphy ............ G06F 17/30315 |
| 2008/0098072 | A1* | 4/2008 | Jones ................... G06Q 10/109 |
| | | | 709/206 |
| 2008/0282112 | A1 | 11/2008 | Bailey et al. |
| 2013/0124610 | A1* | 5/2013 | Smith ................. H04L 12/6418 |
| | | | 709/203 |
| 2013/0124705 | A1 | 5/2013 | Smith et al. |
| 2014/0007258 | A1 | 1/2014 | Anderson et al. |

FOREIGN PATENT DOCUMENTS

| | | |
|---|---|---|
| WO | 03009157 A1 | 1/2003 |
| WO | 2007038584 A1 | 4/2007 |

OTHER PUBLICATIONS

U.S. Appl. No. 13/297,314, Non-Final Office Action, Oct. 4, 2013, 17 pg.

U.S. Appl. No. 13/297,314, Notice of Allowance, Apr. 2, 2015, 15 pg.

U.S. Appl. No. 13/447,925, Non-Final Office Action, Oct. 4, 2013, 20 pg.

U.S. Appl. No. 13/447,925, Notice of Allowance, Apr. 3, 2015, 20 pg.

U.S. Appl. No. 13/297,314, Corrected Notice of Allowability, Sep. 2, 2015, 7 pg.

* cited by examiner

Receive a replicated production load corresponding to a production load on the production server created by processing client requests, wherein the replicated production load is generated in real time while the client requests are processed by the production server and defines state information representing unique states formed between the production server and the clients from which the client requests are received
502

↓

Responsive to receiving the replicated production load, in real time, via a processor, process the replicated production load to generate a plurality of replicated client requests, wherein each of the replicated client requests replicates a respective client request received by the production server and at least a portion of the replicated client requests define the state information associated with the respective client from which the client request is received
504

↓

For a plurality of client requests, map corresponding production socket connections to respective test socket connections associated with the corresponding replicated client requests
506

↓

Communicate the replicated client requests to the test server in real time
508

GENERATING PRODUCTION SERVER LOAD ACTIVITY FOR A TEST SERVER

CROSS-REFERENCE TO RELATED APPLICATIONS

This application is a Continuation of U.S. application Ser. No. 13/447,925, filed on Apr. 16, 2012, which is a Continuation of U.S. application Ser. No. 13/297,314. The entirety of U.S. application Ser. Nos. 13/447,925 and 13/297,314 are incorporated herein by reference.

BACKGROUND

One or more embodiments disclosed within this specification relate to testing of production servers.

A production server is a server that hosts one or more live applications accessible to clients via a communication network, such as an intranet or the Internet. A production server typically hosts the most recent version of its respective application(s). Prior to moving an application, or an updated version of the application, to a production server to go live, the application may be hosted on a staging server during development. While executing on the staging server, the application typically is only available to developers of the application or users who are tasked with testing the application's functionality. Accordingly, the staging server provides a platform on which the application can be tested before going live.

BRIEF SUMMARY

One or more embodiments disclosed within this specification relate to a method of replicating on a test server a production load of a production server. The method can include creating the production load on the production server by processing client requests received from clients. The method further can include, while the client requests are processed, via a processor, in real time, replicating the production load to generate a replicated production load that represents the client requests and defines state information representing unique states formed between the production server and the respective clients. The method also can include, in real time, communicating the replicated production load in order to replicate the production load on the test server.

Another embodiment includes a method of replicating on a test server a production load of a production server. The method can include receiving a replicated production load corresponding to a production load on the production server created by processing client requests. The replicated production load can be generated in real time while the client requests are processed by the production server. The replication production load also can define state information representing unique states formed between the production server and the clients from which the client requests are received. Responsive to receiving the replicated production load, in real time, via a processor, the replicated production load can be processed to generate a plurality of replicated client requests. Each of the replicated client requests can replicate a respective client request received by the production server and at least a portion of the replicated client requests can define the state information associated with the respective client from which the client request is received. The method further can include, in real time, communicating the replicated client requests to the test server.

Another embodiment can include computer program product for replicating on a test server a production load of a production server. The computer program product can include computer-readable program code embodied therewith, the computer-readable program code configured to perform the various operations and/or functions disclosed within this specification.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Several definitions that apply throughout this document will now be presented. As used herein, the term "real time" means a level of processing responsiveness that a user or system senses as sufficiently immediate for a particular process or determination to be made, or that enables the processor to keep up with some external process.

As used herein, the term "production server" means a processing system comprising at least one processor and hosts one or more live applications accessible via a communication network. As used herein, an application that remains live means an application that is operational to serve clients via a communication network, such as an intranet or the Internet, in its intended manner. As used herein, the term "test server" means a processing system comprising at least one processor and hosts one or more applications for the purpose of testing such application(s). As used herein, the term "intermediary server" means a processing system comprising at least one processor that receives data from a production server, and communicates corresponding data to a test server.

As used herein, the term "client" means a processing system comprising at least one processor and which generates client requests that are communicated to a production server. As used herein, the term "client request" means a message requesting some action to be performed by a production server. For example, a client request can request information to be retrieved or processed. As used herein, the term "production load" refers to discrete independently meaningful units called "production load units." In one embodiment, each production load unit can correspond to a separate client request.

Embodiments described herein relate to replicating on a test server a production load of a production server. While the production server hosts one or more live applications, the production server can receive client requests from one or more clients to access the live application(s). The production server can process such client requests, and generate responses to the client requests, thus creating a production load on the production server. When the client requests are processed by the production server, the production load represented by the client requests can be replicated to generate a replicated production load. The replicated production load represent the client requests. Further, the replicated production load can define state information representing unique states formed between the production server and the clients from which the identified client requests are received.

The replicated production load can be communicated to a manifold proxy, which can process the replicated production load to generate replicated client requests. Each replicated client request can replicate a respective client request received by the production server, as well as the state information associated with the respective client request. The manifold proxy can send the replicated client requests to the test server.

The test server can host one or more copies of applications hosted by the production server, which can process the replicated client requests. Such processing can be monitored by an analysis application to identify defects, oftentimes referred to as "bugs," in the application(s), or to compare performance of a test version of an application to a production version of the application. In this regard, the copies of the applications hosted on the test server can be instrumented with code to facilitate such analysis. Notably, the fore mentioned processes can be performed in real time, and can continue as long as desired. Accordingly, the applications hosted by the production server can be analyzed while the production applications remain live. Thus, the production server need not be taken off-line to perform the analysis, and can continue to serve clients. Moreover, the analysis can be performed using the same live conditions experienced by the production server. These conditions may change over time, and such changes can be replicated in the test server.

Figure 1:
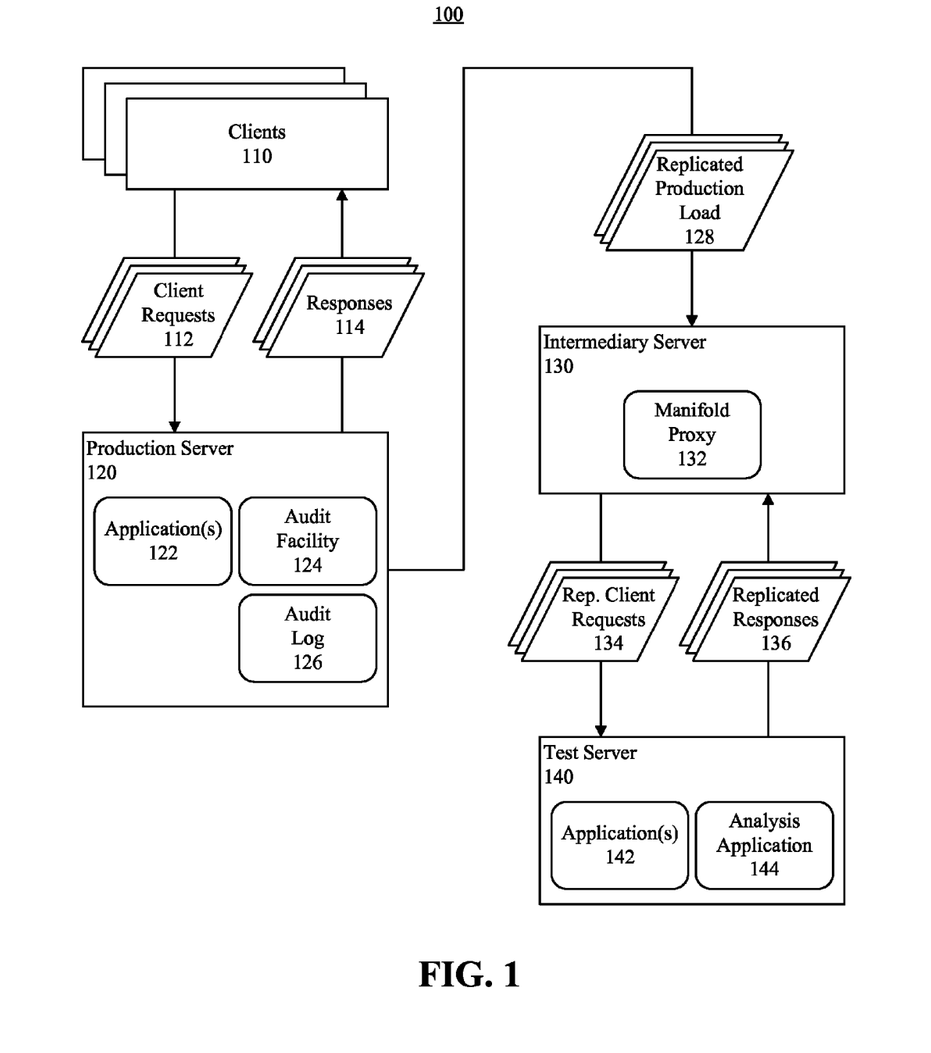
FIG. 1 is a block diagram illustrating a system for replicating on a test server a production load of a production server in accordance with one embodiment of the present invention.

FIG. 1 is a block diagram illustrating a system 100 for replicating on a test server a production load of a production server in accordance with one embodiment of the present invention. In this regard, the system can include one or more clients 110, a production server 120, a test server 140 and, optionally, an intermediary server 140.

The production server 120 can host (e.g., execute) one or more applications 122. Examples of an application 122 include, but are not limited to, a website, a Lightweight Directory Access Protocol (LDAP) server, a database, a web-based application, a network based application, and the like. The production server 120 also can host an audit facility 124, which will be described herein in greater detail. In one embodiment, the intermediary server 130 can host a manifold proxy 132, which also will be described herein in greater detail. In another embodiment, the manifold proxy 132 can be hosted on the test server 140.

The test server 140 can one or more host applications 142 and an analysis application 144. The application(s) 142 can be a copy (or copies) of application(s) 122 hosted on the production server 120 that are to be analyzed by the analysis application 144. An application 142 can be the same version as a corresponding application 122, for example when the application is being analyzed for potential defects, or the application 142 can be a different version than the application 122, for example when performance enhancements to the application are being tested. In this regard, the application(s) 142 can be considered to be computer program(s) under test. Hereinafter, reference may be made to an application 122 and/or an application 142, but it will be understood that each such reference may refer to a plurality of the respective applications 122 and/or applications 142.

The clients 110 can be communicatively linked to the production server 120, the production server can be communicatively linked to the intermediary server 130, and the intermediary server 130 can be communicatively linked to the test server 140. In an arrangement in which the manifold proxy 132 is hosted on the test server 140, the production server 120 can be communicatively linked to the test server 140 in lieu of the intermediary server 130. One or more networks can be utilized to provide such communication links. The networks can include public networks, for example the Internet, and/or private networks, such as LANs, WANs, or the like.

In operation, the production server 120 can be operational and executing the application 122 to serve the clients 110. The production server 120 can receive and identify a plurality of client requests 112 from the clients 110 directed to the application 122. The application 122 can process the client requests 112 and return responses 114 to the clients 110 in a manner conventional for the application 122. When the client requests 112 are received by the production server 120, in real time, the audit facility 124 can generate audit records corresponding to client requests 112, and store the audit records to an audit log 126. Further, the audit facility 124 can generate a message related to a particular client request 112.

The audit facility 124 can communicate the message to the manifold proxy 132. If the manifold proxy 132 is hosted on the intermediary server 130, the message can be sent to the intermediary server 130. If the manifold proxy 132 is hosted on the test server 140, the message can be sent to the test server 140. During normal operation, the production server 120 can receive a plurality of client requests 112, and the audit facility can generate and communicate a plurality of corresponding messages, each representing a production load unit. Collectively, the plurality of such messages can replicate the production load of the production server 120, and thus collectively are referred to herein as a replicated production load 128.

Each message can include specific information related to a particular client request 112, for example, an action or actions requested of the application 122 or other processes on the production server 120. Further, each message can include state information representing a unique state formed between production the server 120 and the client 110 from which the client request 112 is received. Such state information can include, for example, a connection identifier for the socket connection via which the client request 112 was received, one or more cookies associated with the client request 112 based on prior usage of the production server 120 by the client 110, page services provided to the client 110, connection handles allocated to the client 110, bind information corresponding to the client 110 (e.g., user name and/or password), and/or any other information representing a unique state formed between the production server 120 and the client 110.

As the manifold proxy 132 receives the messages, in real time, the manifold proxy 132 can parse data from each message and generate a replicated client request 134 that corresponds to the client request 112 upon which the message is based. Each replicated client request 134 can include the specific information related to its corresponding client request 112, as well as the state information that represents the unique state formed between the production server 120 and the client 110 from which the client request 112 was received.

In one embodiment, the manifold proxy 112 can filter the messages of the replicated production load 128 in order to filter client requests 112 that are replicated to the test server 140 using the replicated client requests 134. In another embodiment, the audit records, and thus the client requests 112, can be selectively filtered to identify a portion of the client requests 112 for which corresponding messages are generated. For example, messages corresponding to client requests 112 associated with certain users or passwords can be ignored, or messages corresponding to certain types of client requests 112 can be ignored, and corresponding replicated client requests 134 need not be generated. For example, password checks or write requests can be ignored and not replicated. Further, the selective filtering can identify messages corresponding to certain types of client requests 112 that are to be processed to generate the replicated client requests 134. For example, only client requests 112 related to LDAP directory or database searches can be replicated.

When a particular message corresponds to a client request 112 requesting a socket connection (production socket connection) be established for a respective client 110 by the production server 120, the corresponding replicated client request 134 can request a socket connection (test socket connection) be established by the test server 140. The test socket connection identifier that is generated may not be the same identifier generated for the production socket connection. Nonetheless, the manifold proxy 132 can create an association between the respective identifiers, and store this association in a mapping table. Based on the association, the manifold proxy 132 can map the production socket connection to the test socket connection. Accordingly, when a plurality of client requests 112 are provided to the production server 120 via a particular production socket connection, the manifold proxy 132 can ensure that their corresponding replicated client requests 134 will be sent over the same test socket connection.

As each replicated client request 134 is generated, the manifold proxy can, in real time, communicate the replicated client request 134 to the test server 140, which can pass the replicated client request to the application 142. The replicated client requests 134 can be formatted in accordance with a protocol understood by the application 142. For example, if a particular client request 112 is formatted in accordance with LDAP, the corresponding replicated client request 134 can be formatted in accordance with LDAP. This is but one example of a client request format, and the invention is not limited in this regard. The application 142 can process the replicated client requests 134 and return replicated responses 136 to the manifold proxy 132 in a manner conventional for the application 142.

As the application 142 processes the replicated client requests 134, the analysis application can analyze execution of the application 142 to identify any defects that may be present in the code of the application 142, or to analyze performance of the application 142. For example, the application 142 can be instrumented with program code to generate events as the application 142 executes, and such events can be detected by the analysis application 144. Application instrumentation and analysis applications are known to those skilled in the art.

Figure 2:
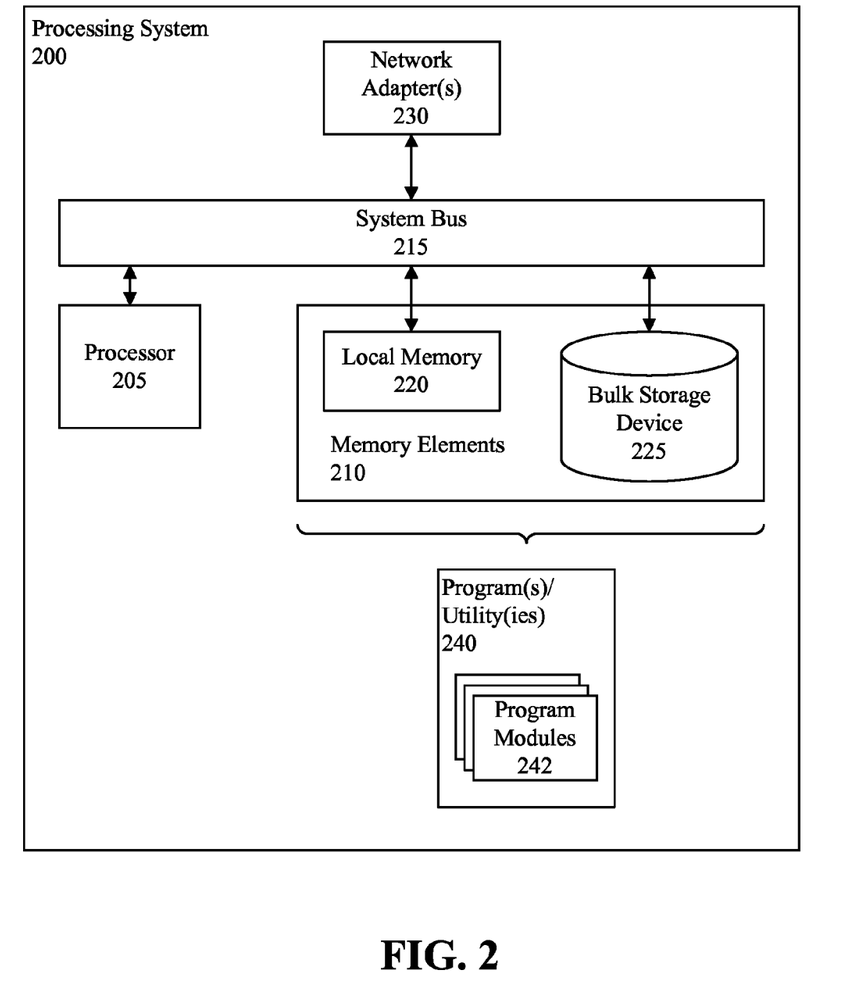
FIG. 2 is a block diagram illustrating a processing system in accordance with one embodiment of the present invention.

FIG. 2 is a block diagram illustrating an example of a processing system 200 in accordance with one embodiment of the present invention. The processing system 200 can be a client, a production server, an intermediary server or a test server. The processing system 200 can include at least one processor 205 coupled to memory elements 210 through a system bus 215. As such, the processing system 200 can store program code within the memory elements 210. The processor 205 can execute the program code accessed from the memory elements 210 via the system bus 215. In one aspect, for example, the processing system 200 can be implemented as a computer that is suitable for storing and/or executing program code. It should be appreciated, however, that the processing system 200 can be implemented in the form of any system comprising a processor and memory that is capable of performing the functions described within this specification.

The memory elements 210 can include one or more physical memory devices such as, for example, local memory 220 and one or more bulk storage devices 225. Local memory 220 refers to random access memory or other non-persistent memory device(s) generally used during actual execution of the program code. The bulk storage device(s) 225 can be implemented as a HDD, SDD, or other persistent data storage device. The processing system 200 also can include one or more cache memories (not shown) that provide temporary storage of at least some program code in order to reduce the number of times program code must be retrieved from bulk storage device 225 during execution.

One or more network adapters 230 can be coupled to the processing system 200, either directly to the system bus 215 or through intervening I/O controllers, to enable the processing system 200 to become coupled to other systems, computer systems, remote printers, and/or remote storage devices through intervening private or public networks. Modems, cable modems, Ethernet cards wireless network adapters are examples of different types of network adapters that can be used with the processing system 200, but the invention is not limited in this regard. Other I/O devices (not shown) also can be coupled to the processing system 200.

By way of example, and not limitation, one or more programs/utilities 240, each having a set (at least one) of program modules 242, may be stored in the memory elements 210, as well as an operating system, one or more application programs, other program modules, and program data. Program modules 142 generally carry out the functions and/or methodologies of embodiments of the invention as described herein.

In illustration, in the case that the processing system 200 is the production server 120 of FIG. 1, the programs/utilities 240 can include the application(s) 122 and audit facility 124. The Audit log 126 also can be stored in the memory elements 210. In the case that the processing system 200 is the intermediary server 130 of FIG. 1, the programs/utilities 240 can include the manifold proxy 132. In the case that the processing system 200 is the test server 140 of FIG. 1, the programs/utilities 240 can include the application(s) 142, analysis application 144 and, optionally, the manifold proxy 132 (if the intermediary server 130 is not used).

Figure 3:
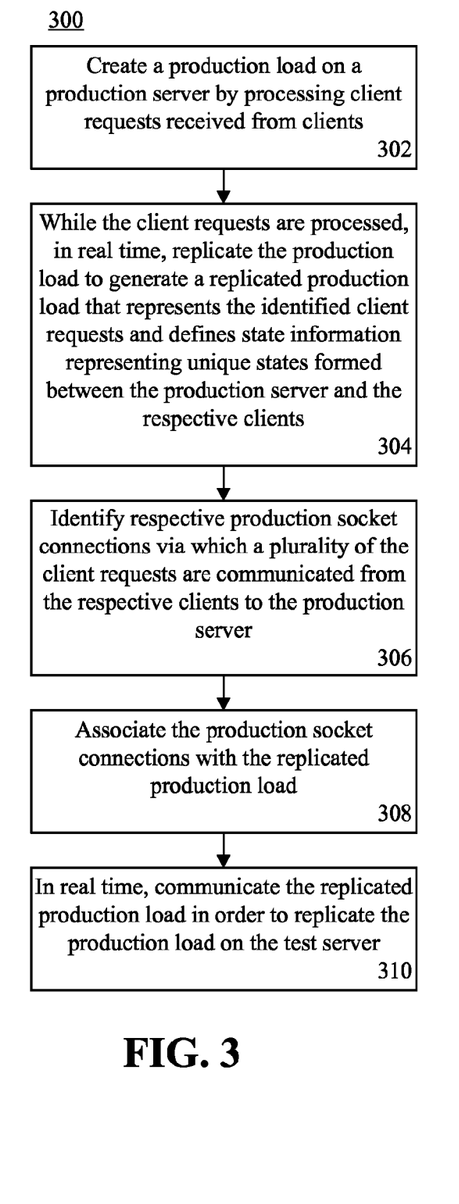
FIG. 3 is a flow chart illustrating a method of replicating on a test server a production load of a production server in accordance with another embodiment of the present invention.

FIG. 3 is a flow chart illustrating a method 300 of replicating on a test server a production load of a production server in accordance with another embodiment of the present invention. The method 300 can be implemented by the audit facility 124 of FIG. 1. At step 302, a production load on a production server can be created by processing client requests received form clients. At step 304, while the client requests are processed, in real time, the production load can be replicated to generate a replicated production load that represents the identified client requests and defines state information representing unique states formed between the production server and the respective clients. At step 306, respective production socket connections via which a plurality of the client requests are communicated from the respective clients to the production server can be identified. At step 308, the production socket connections can be associated with the replicated production load. At step 310, in real time, the replicated production load can be communicated in order to replicate the production load on the test server. For example, the replicated production load can be communicated to the manifold proxy 132 of FIG. 1.

Figure 4:
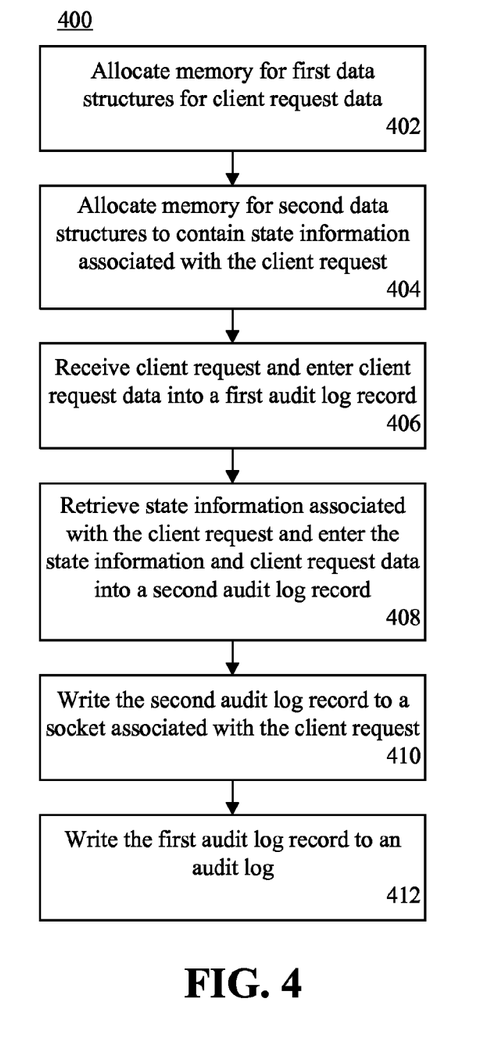
FIG. 4 is a flow chart illustrating a method of generating a message of a replicated production load in accordance with another embodiment of the present invention.

FIG. 4 is a flow chart illustrating a method 400 of generating a message of a replicated production load in accordance with another embodiment of the present invention. Again, the method 400 can be implemented by the audit facility 124 of FIG. 1.

At step 402, memory can be allocated for first data structures for client request data. At step 404, memory can be allocated for second data structures for a manifold proxy data record. At step 406, a client request can be received by the production server and the audit facility can enter the client request data into a first audit log record. At step 408, the audit facility can retrieve state information associated with the client request and enter the state information, as well as and the client request data, into a second audit log record. At step 410, the audit facility can write the second audit log record to a socket associated with the manifold proxy, thereby generating a message representing a production load unit and communicating the message to the manifold proxy. At step 414, the audit facility can write the first audit log record to an audit log file on the production server.

Figure 5:
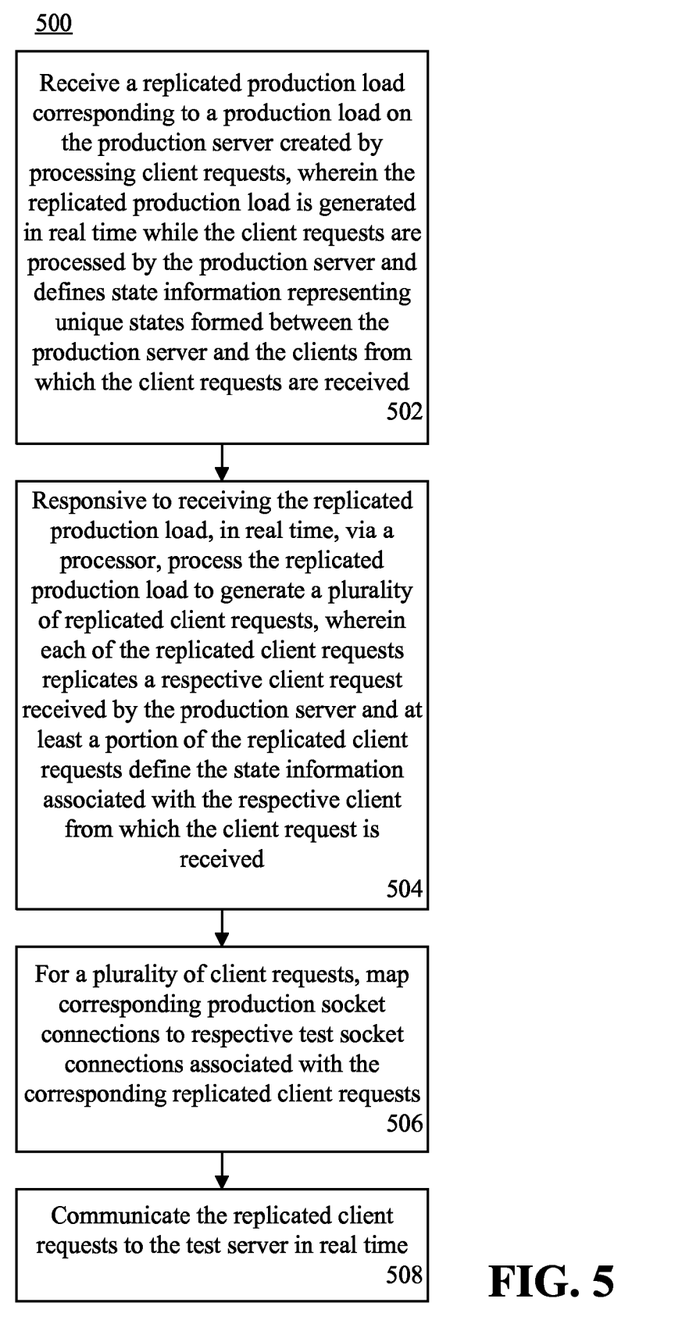
FIG. 5 is a flow chart illustrating another method of replicating on a test server a production load of a production server in accordance with another embodiment of the present invention.

FIG. 5 is a flow chart illustrating another method 500 of replicating on a test server a production load of a production server in accordance with another embodiment of the present invention. The method 500 can be implemented by the manifold proxy 132 of FIG. 1.

At step 502, a replicated production load can be received. The replicated production load can correspond to a production load on the production server created by processing client requests. The replicated production load can generated in real time while the client requests are processed by the production server and can define state information representing unique states formed between the production server and the clients from which the client requests are received.

At step 504, responsive to receiving the replicated production load, in real time, the replicated production load can be processed via a processor to generate a plurality of replicated client requests. Each of the replicated client requests can replicate a respective client request received by the production server. At least a portion of the replicated client requests further can replicate the state information associated with the respective client from which the client request is received. In other words, some of the replicated client requests can replicate respective state information, or all of the replicated client requests can replicate respective the state information.

At step 506, for a plurality of client requests, corresponding production socket connections can be mapped to respective test socket connections associated with the corresponding replicated client requests. At step 508, the replicated client requests can be communicated to the test server in real time.

Figure 6:
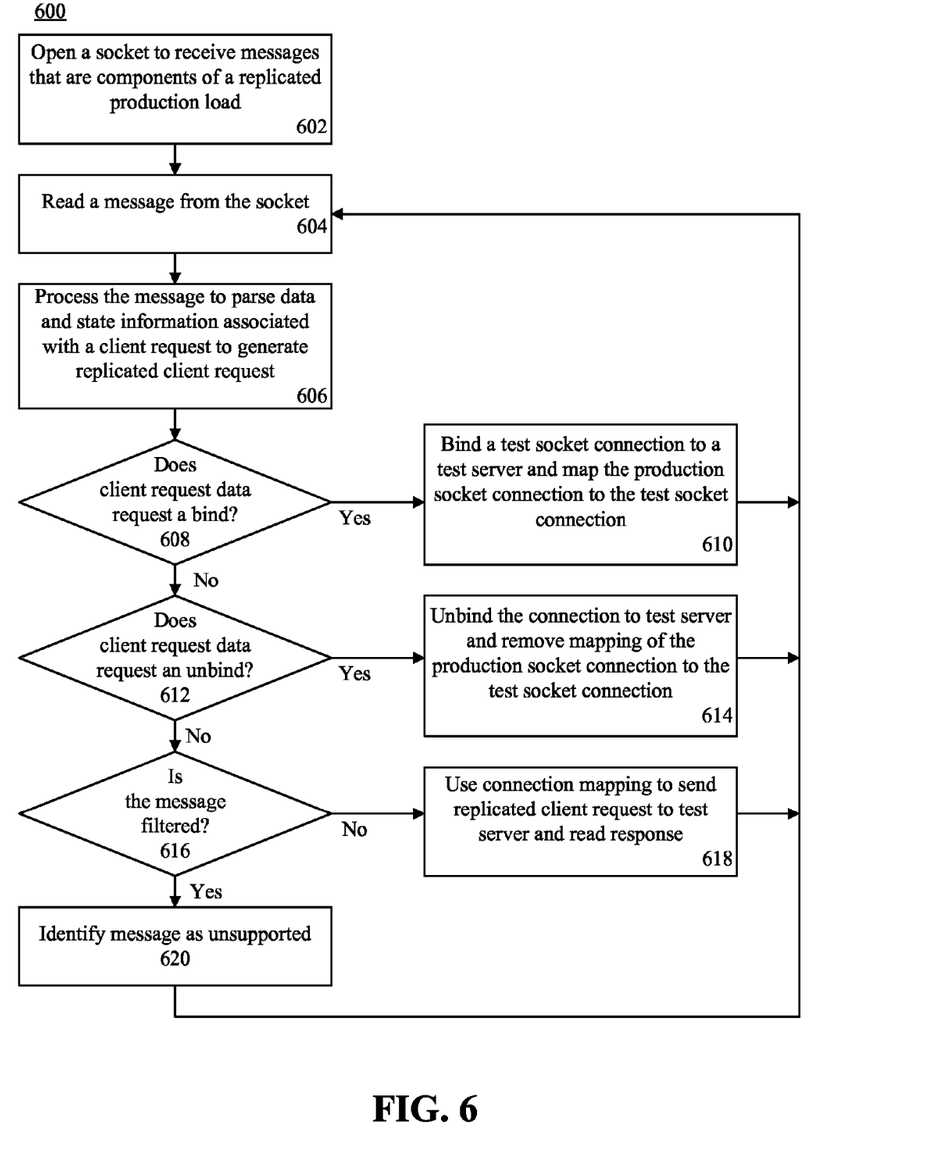
FIG. 6 is a flow chart illustrating a method of processing a replicated client request on a test server in accordance with another embodiment of the present invention.

FIG. 6 is a flow chart illustrating a method of processing a replicated client request on a test server in accordance with another embodiment of the present invention. Again, the method 600 can be implemented by the manifold proxy 132 of FIG. 1.

At step 602, the manifold proxy can open a socket to received from a production server messages that are components of a replicated production load. For example, the messages can be received from an auditing facility or another suitable program/utility suitably configured to generate such messages. At step 604, a message can be read from the socket (i.e., received). At step 606, the message can be processed to parse client request data and state information.

At decision box 608, if the client request data requests a bind, at step 610 a bind of a test socket connection to the test server can be created and the production socket connection can be mapped to the test socket connection. If the client request data does not request a bind the process can proceed to decision box 612. At decision box 612, if the client request data requests and unbind, at 614 an unbind of the test socket connection to the test server can be implemented, and the mapping of the production socket connection to the test socket connection can be removed. If at decision box 612 the client request data does not request an unbind, at decision box 616 a determination can be made whether the message is filtered out. If not, the connection mapping can be used to send the replicated client request to the test server, and a response can be read. If the message is filtered, at step 620 the message can be identified as unsupported, and thus the replicated client request need not be sent to the test server.

From steps 610, 614, 618 and 620, the process can return to step 604, and another message can be read from the socket. The process can continue to repeat until a decision is made to stop the process.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of replicating on a test server a production load of a production server, the method comprising:
    receiving from the production server a plurality of messages representing the production load on the production server, each message corresponding to a respective client request received from a respective client; and
    responsive to receiving each message, in real time, parsing data from the message and, from the parsed data, generating a replicated client request corresponding to the client request, wherein the replicated client request comprises state information representing a unique state formed between the production server and the respective client, and, in real time, communicating the replicated client request to a test server, without altering a behavior of the production server with respect to services provided to clients by the production server, in order to replicate the production load on the test server.

2. The method of claim 1, further comprising:
configuring an audit facility to automatically generate, by the production server, the message corresponding to the respective client request in real time responsive to the client request being processed by the production server.

3. The method of claim 1, further comprising:
identifying a respective production socket connection via which the client request is communicated from the respective client to the production server;
wherein communicating the replicated client request to the test server in order to replicate the production load on the test server comprises communicating the replicated client request via a test socket connection correlating to the production socket connection.

4. The method of claim 1, wherein the state information indicates at least one cookie associated with the client request based on prior usage of the production server.

5. The method of claim 1, wherein the state information indicates at least one page service provided to the respective client.

6. The method of claim 1, wherein the state information indicates a connection handle allocated for the respective client.

7. The method of claim 1, wherein the state information indicates bind information associated with the respective client request.

8. A method of replicating on a test server a production load of a production server, the method comprising:
receiving from the production server a replicated production load corresponding to a production load on the production server created by processing client requests, wherein the replicated production load is generated in real time while the client requests are processed by the production server and defines state information representing unique states formed between the production server and the clients from which the client requests are received;
responsive to receiving the replicated production load, in real time, via a processor, filtering the replicated production load to prevent certain client requests from being replicated to the test server and processing the filtered replicated production load to generate a plurality of replicated client requests, wherein each of the replicated client requests replicates a respective client request received by the production server and at least a portion of the replicated client requests define the state information associated with the respective client from which the client request is received; and
in real time, communicating the replicated client requests to the test server.

9. The method of claim 8, wherein:
the client requests are communicated from the clients to the production server via production socket connections established between the respective clients and the production server; and
processing the replicated production load to generate the plurality of replicated client requests comprises, for a plurality of the client requests, mapping corresponding production socket connections to respective test socket connections associated with the corresponding replicated client requests.

10. The method of claim 8, wherein the state information indicates cookies associated with the respective clients that vary based on prior usage of the production server.

11. The method of claim 8, wherein the state information indicates page services provided to the respective clients.

12. The method of claim 8, wherein the state information indicates connection handles allocated for the respective clients.

13. The method of claim 8, wherein the state information indicates bind information associated with the respective client requests.

* * * * *